United States Patent
Watterworth et al.

(10) Patent No.: US 9,180,761 B1
(45) Date of Patent: Nov. 10, 2015

(54) HINGE ASSEMBLY

(71) Applicant: GM GLOBAL TECHNOLOGY OPERATIONS LLC, Detroit, MI (US)

(72) Inventors: Eric A. Watterworth, Orion, MI (US); Dominic S. Pupillo, Clarkston, MI (US); Steven A. Stahn, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/268,487

(22) Filed: May 2, 2014

(51) Int. Cl.
*B60J 5/04* (2006.01)
*E05D 3/02* (2006.01)
*E05D 7/00* (2006.01)

(52) U.S. Cl.
CPC ................. *B60J 5/0468* (2013.01); *E05D 3/02* (2013.01); *E05D 7/00* (2013.01)

(58) Field of Classification Search
CPC .............. B60J 5/04; B60J 5/047; E05D 3/02; E05D 2003/025; E05D 2003/027; E05D 5/02; E05D 5/06; E05D 5/0207; E05D 5/043; E05D 5/062; E05D 7/00
USPC ......................... 296/146.11; 16/374, 386, 387
See application file for complete search history.

(56) References Cited

U.S. PATENT DOCUMENTS

| 4,881,298 | A  | * | 11/1989 | Turnbull | 16/266 |
|---|---|---|---|---|---|
| 5,408,785 | A  | * | 4/1995 | Heim et al. | 49/502 |
| 5,791,018 | A  | * | 8/1998 | Yoshinobu | 16/374 |
| 6,817,062 | B2 | * | 11/2004 | Cho | 16/328 |
| 8,156,611 | B2 | * | 4/2012 | Machin et al. | 16/261 |
| 8,307,514 | B2 | * | 11/2012 | Clark, Sr. | 16/386 |
| 8,757,707 | B2 | * | 6/2014 | Hamasaki | 296/198 |
| 2009/0007381 | A1 | * | 1/2009 | Brown et al. | 16/335 |
| 2009/0015036 | A1 | * | 1/2009 | Brown et al. | 296/146.11 |
| 2009/0072582 | A1 | * | 3/2009 | Elliott et al. | 296/146.11 |
| 2009/0096246 | A1 | * | 4/2009 | Patzer et al. | 296/146.11 |
| 2010/0301631 | A1 | * | 12/2010 | Scott et al. | 296/146.12 |
| 2013/0214561 | A1 | * | 8/2013 | Chaufour et al. | 296/207 |
| 2015/0151691 | A1 | * | 6/2015 | Wu | 224/275 |

FOREIGN PATENT DOCUMENTS

WO 2010064529 A1 6/2010

* cited by examiner

*Primary Examiner* — Gregory Blakenship
(74) *Attorney, Agent, or Firm* — Quinn Law Group, PLLC

(57) ABSTRACT

A hinge assembly includes a body strap having a main body. The main body defines a first surface end and a second surface opposite the first body end. The body strap includes a first pin support and a second pin support. The first and second pin supports extend from the main body. The body strap includes a protrusion extending from the second body end of the main body. The protrusion defines a first protrusion end and a second protrusion end opposite the first protrusion end. The hinge assembly further includes a door strap partially disposed between the first and second pin supports and a pin movably interconnecting the body strap and the door strap. The pin extends along an axis and is supported by the first and second pin supports.

20 Claims, 3 Drawing Sheets

HINGE ASSEMBLY

TECHNICAL FIELD

The present disclosure relates to a hinge assembly for movably coupling a vehicle body to a vehicle door.

BACKGROUND

Vehicles, such as cars, include a vehicle body and a vehicle door movable relative to the vehicle body between an open position and a closed position. To couple the door to the vehicle body, the vehicle may include a hinge assembly. The hinge assembly can pivotally couple the vehicle door to the vehicle body.

SUMMARY

It is useful to enhance the structural integrity of the hinge assembly in order to maintain the vehicle door coupled to vehicle body, especially when the vehicle is subjected to an external force. To this end, the present disclosure describes a hinge assembly capable of maintaining the vehicle door coupled to the vehicle door even when an external force is applied to the vehicle. In an embodiment, a hinge assembly includes a body strap having a main body. The main body defines a first surface end and a second surface opposite the first body end. The body strap includes a first pin support and a second pin support. The first and second pin supports extend from the main body. The body strap includes a protrusion extending from the second body end of the main body. The protrusion defines a first protrusion end and a second protrusion end opposite the first protrusion end. A first distance is defined from the second surface to the second protrusion end in a direction orthogonal to the second surface. The hinge assembly further includes a door strap partially disposed between the first and second pin supports. Further, the hinge assembly includes a pin movably interconnecting the body strap and the door strap. The pin extends along an axis and is supported by the first and second pin supports. A second distance is defined from the second surface to the axis along the direction orthogonal to the second surface. The first distance is greater than the second distance. The protrusion may include an annular body at least partially surrounding the pin.

The present disclosure also relates to a vehicle including a vehicle body, a vehicle door, and a hinge assembly as described above. The hinge assembly movably couples the vehicle door to the vehicle body.

The above features and advantages and other features and advantages of the present invention are readily apparent from the following detailed description of the best modes for carrying out the invention when taken in connection with the accompanying drawings.

DETAILED DESCRIPTION

Figure 1:
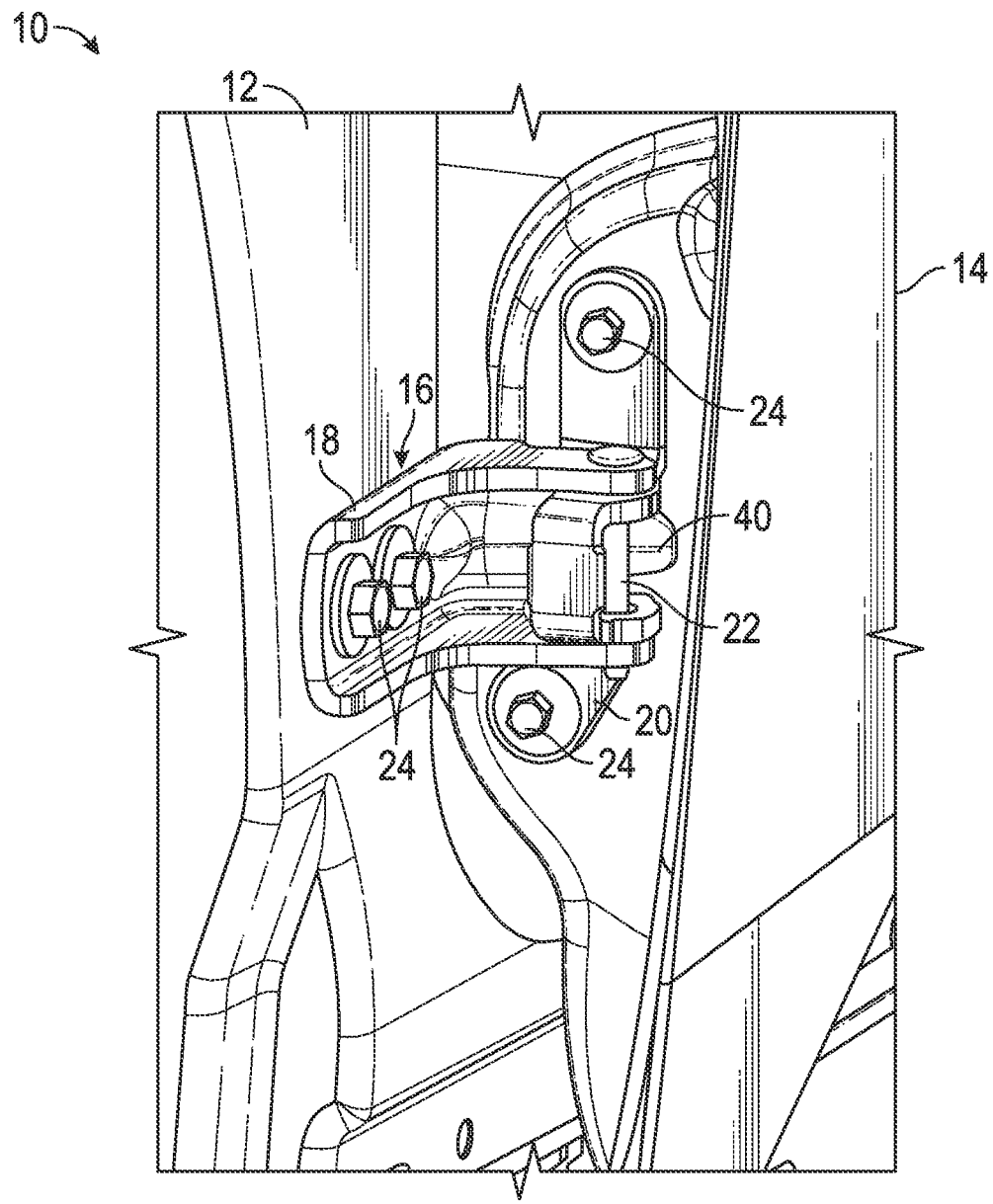
FIG. 1 is a schematic, perspective view of part of a vehicle, depicting a vehicle door, a vehicle body, and a hinge assembly movably coupling the vehicle door to the vehicle body.

Referring to the drawings, wherein like reference numbers correspond to like or similar components throughout the several figures, FIG. 1 schematically illustrates a vehicle 10 including a vehicle body 12, a vehicle door 14, and a hinge assembly 16 movably coupling the vehicle door 14 to the vehicle body 12. The vehicle 10 may be a car or any other land, air, or sea vehicle. Regardless of the kind of vehicle 10, the hinge assembly 16 allows the vehicle door 14 to move (e.g., pivot) relative to the vehicle body 12 between an open position and a closed position.

The hinge assembly 16 includes a body strap 18, a door strap 20, and a pin 22 movably coupling the door strap 20 to the body strap 18. As such, the door strap 20 can move relative to the body strap 18. For example, the pin 22 can rotatably (e.g., pivotally) couple the door strap 20 to the body strap 18. Consequently, the door strap 20 can rotate (e.g., pivot) relative to the body strap 18. The body strap 18, the door strap 20, and the pin 22 are wholly or partly made of a substantially rigid material, such as a metal, metal alloy, a rigid polymeric material, or a combination thereof.

The body strap 18 is coupled to the vehicle body 12. In particular, the body strap 18 is fixed to the vehicle body 12. Accordingly, the vehicle body 12 remains stationary relative to the body strap 18. As a non-limiting example, at least one fastener 24, such as a screw or bolt, can fix the body strap 18 to the vehicle body 12. In the depicted embodiment, two fasteners 24 fix the vehicle body 12 to the body strap 18.

The door strap 20 is coupled to the vehicle door 14. In particular, the door strap 20 is fixed to the vehicle door 14. Accordingly, the vehicle door 14 remains stationary relative to the door strap 20. As a non-limiting example, at least one fastener 24, such as a screw or bolt, can fix the door strap 20 to the vehicle door 14. In the depicted embodiment, two fasteners 24 fix the vehicle door 14 to the door strap 20.

Figure 2:
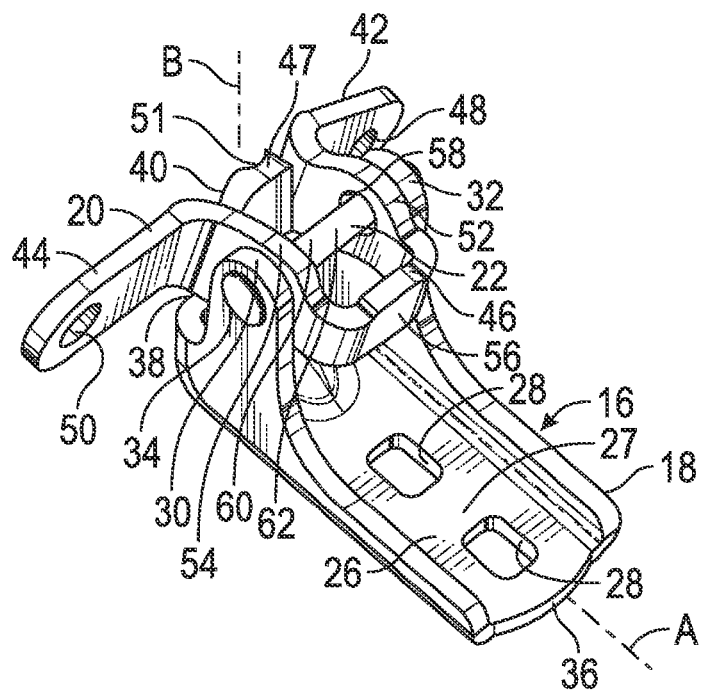
FIG. 2 is a schematic, perspective front view of the hinge assembly shown in FIG. 1.
Figure 3:
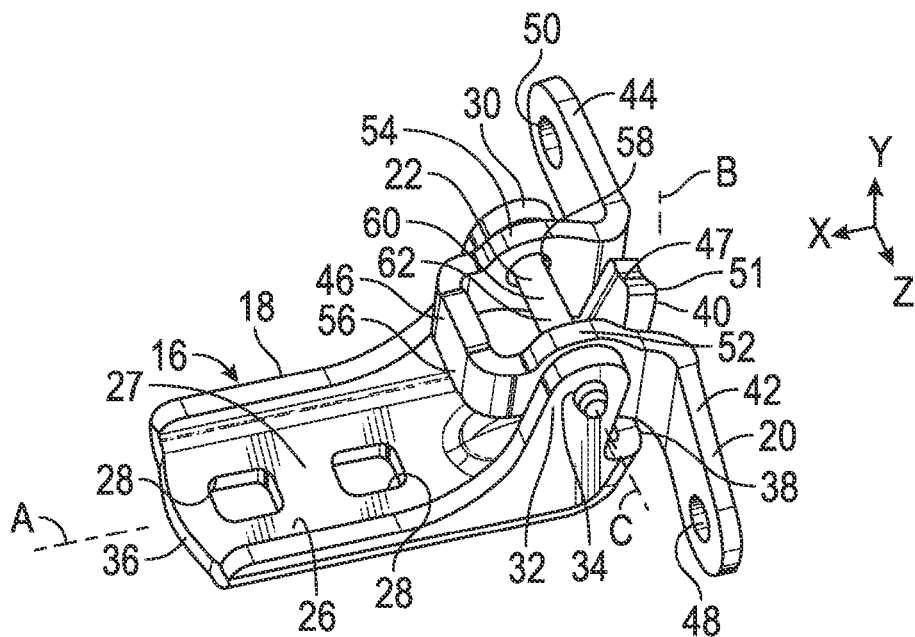
FIG. 3 is a schematic, perspective side view of the hinge assembly shown in FIG. 1.
Figure 4:
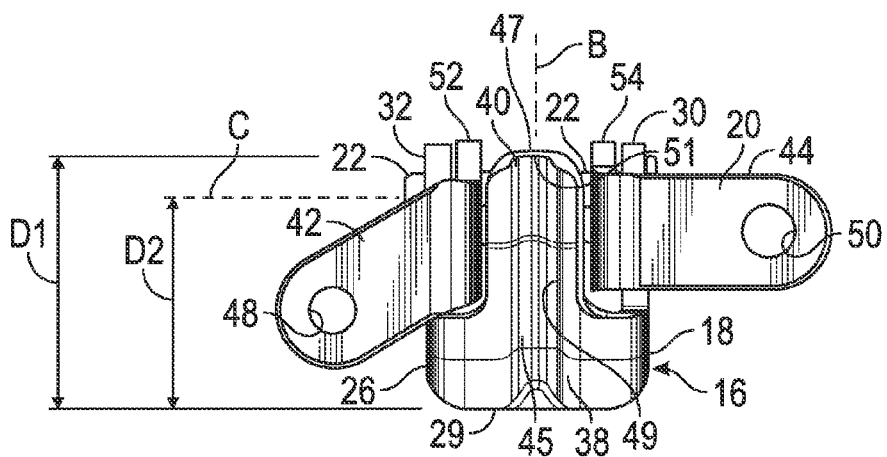
FIG. 4 is a schematic, rear view of the hinge assembly shown in FIG. 1.

With reference to FIGS. 2-4, the body strap 18 includes a main body 26 extending along a first axis A. In other words, the main body 26 extends along a first direction X. The main body 26 defines a first body end 36 and a second body end 38 opposite the first body end 36. The first body end 36 is spaced apart from the second body end 38 along the first direction X. Moreover, the body strap 18 defines at least one body hole 28 extending through the main body 26. In the depicted embodiment, the body strap 18 defines two body holes 28. It is contemplated, however, that the body strap 18 may have more or fewer body holes 28. Irrespective of the quantity, each body hole 28 is configured, shaped, and sized to receive at least one fastener 24.

The main body 26 also defines a first or top surface 27 and a second or bottom surface 29 opposite the first surface 27. The second surface 29 is spaced apart from the first surface 27 along a second direction Y. The second direction Y is substantially perpendicular to the first direction X. Further, the second direction Y may be referred to as "a direction orthogonal to the second surface 29" or as "a direction orthogonal to the first surface 29."

The body strap 18 includes a first pin support 30 and a second pin support 32 each configured to support the pin 22. Each of the first and second pin supports 30, 32 extends from the main body 26 along a second axis B. The second axis B is substantially perpendicular to the first axis A. Each of the first and second pin supports 30, 32 extends from the main body 26 along the second direction Y. Furthermore, the first pin support 30 is spaced apart from the second pin support 32 along a third direction Z. The third direction Z is substantially perpendicular to the first direction X and the second direction Y. The pin 22 extends along the third direction Z and is supported by the first and second pin supports 30, 32. The body strap 18 also defines pin body holes 34 extending through the first pin support 30 and the second pin support 32. In particular, one pin body hole 34 extends through the first pin support 30, and another pin body hole 34 extends through the second pin support 32. Each of the pin body holes 34 is configured, shaped, and sized to receive at least a portion of the pin 22. When the pin 22 extends through the pin body holes 34, the first and second pin supports 30, 32 carry the pin 22, thereby coupling the pin 22 to the body strap 18. In other words, the pin 22 is supported by the first and second pin supports 30, 32.

The body strap 18 further includes a protrusion 40 extending from the main body 26. In the depicted embodiment, the protrusion 40 is configured as a column and extends from the second body end 38 of the main body 26 along the second direction Y. As such, at least a portion of the protrusion 40 is disposed over the pin 22 such that the protrusion 40 at least partially overlaps the pin 22 along the first direction X. Placing the protrusion 40 over the pin 22 helps maintain the pin 22 connected to the body strap 18 and the door strap 20 when an external force is applied to the vehicle 10 (FIG. 1). In the depicted embodiment, the protrusion 40 only partially overlaps the pin 22 at least along the third direction Z. In other words, the protrusion 40 extends from the second body end 38 along the second direction such that the pin is at least partially aligned with the protrusion along the first direction X.

The protrusion 40 defines a first protrusion end 45 and a second protrusion end 47 opposite the first protrusion end 45. The first protrusion end 45 is directly coupled to the main body 26, whereas the second protrusion end 47 may be free. That is, the second protrusion end 47 may be decoupled from the rest of the main body 26. In other words, the second protrusion end 47 is only coupled to the main body 26 through the first protrusion end 45. A first distance D1 is defined from the second surface 45 of the main body 26 to the second protrusion end 47 in a direction orthogonal to the second surface (i.e., the second direction Y).

The protrusion 40 may include a structural integrity feature 49 for enhancing the structural integrity of the protrusion 40. It is useful to enhance the structural integrity of the protrusion 40 in order to minimize separation of the pin 22 from the body strap 18 and the door strap 20. The structural integrity feature 49 may be an undulation 51 that may extend at least from the first protrusion end 45 to the second protrusion end 47.

The door strap 20 includes a first door connection section 42, and a second door connection section 44, and a pin connection section 46 interconnecting the first and second door connection sections 42, 44. The first and second door connection sections 42, 44 extend substantially along the third direction Z, and the protrusion 40 is disposed between the first and second door connection sections 42, 44. The pin connection section 46 is disposed between the first pin support 30 and the second pin support 32. The first and second door connection sections 42, 44 extend along the third direction Z and are each directly coupled to the door 14 (FIG. 1). The door strap 20 defines a first section hole 48 extending through the first door connection section 42 and a second section hole 50 extending through the second door connection section 44. The first and second section holes 48, 50 are each configured, shaped, and sized to receive at least one fastener 24 (FIG. 1). Accordingly, the fasteners 24 (FIG. 1) can be disposed in the first and second section holes 48, 50 to fix the body strap 18 to the vehicle door 14.

The pin connection section 46 is disposed between the first and second door connection sections 42, 44 and may have a C-shape. In particular, the pin connection section 46 is entirely disposed between the first and second pin supports 30, 32. In the depicted embodiment, the pin connection section 46 includes a first wall 52 directly connected to the first door connection section 42, a second wall 54 directly connected to the second door connection section 44, and a third wall 56 directly interconnecting the first and second walls 52, 54. The protrusion 40 is disposed between the first and second walls 52, 54. The first and second walls 52, 54 may extend along the first direction X, while the third wall 56 may extend along the third direction Z. However, the first, second, and third walls 52, 54 56 may have other structural arrangements relative to one another. Regardless of their specific arrangements, the first, second, and third walls 52, 54, 56 may be entirely disposed between the first and second pin supports 30, 32. Accordingly, the door strap 20 is partially disposed between the first and second pin supports 30, 32. The pin 22 extends through the first and second walls 52, 54.

The door strap 20 further defines at least one pin opening 58 extending through the pin connection section 46. In the depicted embodiment, one pin opening 58 extends through the first wall 52, and another pin opening 58 extends through the second wall 54. Irrespective of their exact location and quantity, each pin opening 58 is configured, shaped, and sized to receive the pin 22 such that the door strap 20 is capable of rotating about the pin 22. Thus, when the pin openings 58 receive the pin 22, the door strap 20 can rotate (e.g., pivot) relative to the body strap 18 about the pin 22. Because the pin 22 extends through the pin connection section 46 along a third axis C, the door strap 20 can rotate (e.g., pivot) relative to the body strap 18 about the third axis C. The third axis C is substantially perpendicular to the first axis A and the second axis B.

As discussed above, the pin 22 extends through the first and second pin supports 30, 32 along the third axis C. Further, the pin 22 extends through a portion of the door strap 20 (e.g., the pin connection section 46) along the third direction Z. Specifically, the pin 22 extends through the first wall 52 and the second wall 54 along the third axis C. In the depicted embodiment, the pin 22 is fixed to the body strap 18 (via the first and second pin supports 30, 32) such that the pin 22 remains stationary relative to the body strap 18.

The pin 22 movably interconnects the body strap 18 and the door strap 20 and defines an outer surface 60. The outer surface 60 in turn defines an outer perimeter 62 of the pin 22. The outer perimeter 62 may be, for example, a circumference. For instance, the pin 22 may have a substantially cylindrical shape, and, in that case, the outer perimeter 62 is a circumference. It is envisioned, however, that the pin 22 may have other suitable shapes.

A second distance D2 is defined from the second surface 29 to the third axis C extending along the pin 22 in a direction orthogonal to the second surface 29 (i.e., the second direction Y). The third axis C may be simply referred to as an axis. The first distance D1 may be at least equal to the second distance D2. In the depicted embodiment, the first distance D1 is greater than the second distance D2.

Figure 5:
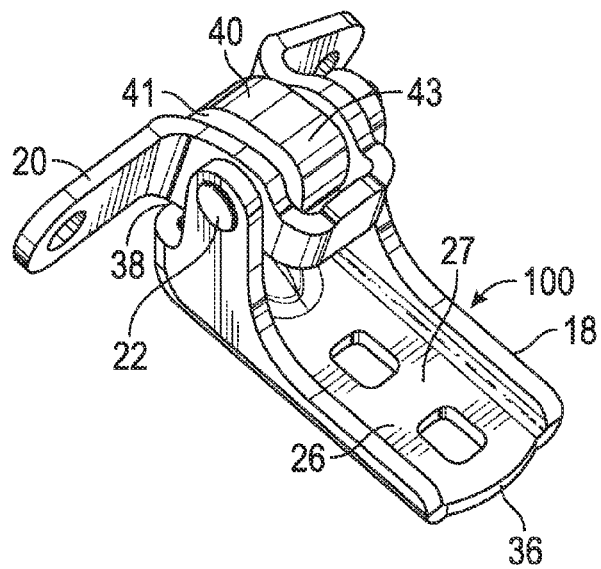
FIG. 5 is a schematic, perspective view of a hinge assembly in accordance with another embodiment of the present disclosure.
Figure 6:
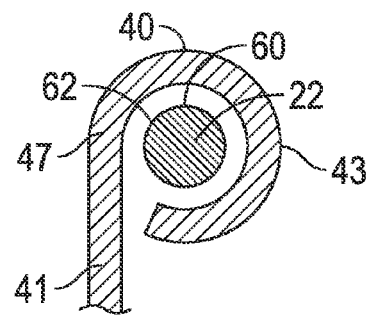
FIG. 6 is a schematic, cross-sectional side view of a pin and a protrusion of the hinge assembly shown in FIG. 5.

FIGS. 5 and 6 depict a hinge assembly 100 in accordance with another embodiment of the present disclosure. The hinge assembly 100 is substantially similar to the hinge assembly 16 described above, except for the features described below.

In the hinge assembly 100, at least part of the protrusion 40 is disposed around the outer perimeter 62 of the pin 22. In this embodiment, the protrusion 40 includes a protrusion body 41 directly connected to the second body end 38 of the main body 26 (as shown in FIG. 4) and an annular body 43 extending from the protrusion body 41. In this embodiment, the second protrusion end 47 corresponds to an end of the protrusion body 41. Accordingly, it can be stated that the protrusion body 41 includes a first protrusion end 45 (FIG. 4) directly coupled to the second end 38 of the main body 26 and a second protrusion end 47 (FIG. 6) opposite to the first protrusion end 45. The annular body 43 is coupled to the second protrusion end 47 and is disposed around the outer perimeter 62 (e.g., circumference) of the pin 22. In other words, the annular body 43 surrounds at least a portion of the outer surface 60 of the pin 22. Thus, the annular body 43 completely or partly surrounds the pin 22. Accordingly, the protrusion 40 is at least partially disposed around the outer perimeter 62 (e.g., circumference) of the pin 22. In other words, the protrusion 40 at least partially surrounds the pin 22. Specifically, the annular body 43 at least partially surrounds the pin 22.

While the best modes for carrying out the invention have been described in detail, those familiar with the art to which this invention relates will recognize various alternative designs and embodiments for practicing the invention within the scope of the appended claims.

The invention claimed is:

1. A hinge assembly, comprising:
a body strap including a main body, the main body defining a first body end and a second body end opposite the first body end, the main body has a first surface and a second surface opposite the first surface, the body strap including a first pin support and a second pin support, the first and second pin supports extending from the main body, the body strap including a protrusion extending from the second body end of the main body, the protrusion defining a first protrusion end and a second protrusion end opposite the first protrusion end, and wherein a first distance is defined from the second surface to the second protrusion end in a direction orthogonal to the second surface;
a door strap partially disposed between the first and second pin supports;
a pin movably interconnecting the body strap and the door strap, the pin extending along an axis and being supported by the first and second pin supports, and wherein a second distance is defined from the second surface to the axis along the direction orthogonal to the second surface; and
wherein the first distance is greater than the second distance.

2. The hinge assembly of claim 1, wherein the protrusion includes a structural integrity feature.

3. The hinge assembly of claim 2, wherein the structural integrity feature is an undulation.

4. The hinge assembly of claim 3, wherein the undulation extends from the first protrusion end to the second protrusion end.

5. The hinge assembly of claim 1, wherein the door strap includes a first door connection section, a second door connection section, and a pin connection section interconnecting the first and second door connection sections, and the protrusion is disposed between the first and second door connection sections.

6. The hinge assembly of claim 5, wherein the pin connection section includes a first wall directly connected to the first door connection section, a second wall directly connected to the second door connection section, and a third wall directly interconnecting the first and second walls, and the protrusion is disposed between the first and second walls.

7. The hinge assembly of claim 6, wherein the pin extends through the pin connection section.

8. The hinge assembly of claim 7, wherein the pin extends through the first and second walls of the pin connection section.

9. The hinge assembly of claim 5, wherein the door strap defines at least one pin opening extending through the pin connection section, and the at least one pin opening receives the pin such that the door strap is capable of rotating about the pin.

10. The hinge assembly of claim 1, wherein the pin has an outer surface, the outer surface defines an outer perimeter, and the protrusion is disposed around the outer perimeter.

11. The hinge assembly of claim 10, wherein the outer perimeter is a circumference and the protrusion includes a protrusion body directly connected to the second body end of the main body, an annular body extending from the protrusion body, the annular body is disposed around the circumference of the pin.

12. The hinge assembly of claim 1, wherein the pin is at least partially disposed between the first and second pin supports.

13. The hinge assembly of claim 1, wherein the protrusion is a column.

14. A vehicle, comprising:
a vehicle body;
a vehicle door;
a hinge assembly movably coupling the vehicle door to the vehicle body such that the vehicle door is movable relative to the vehicle body, the hinge assembly including:
a body strap including a main body, the main body defining a first body end and a second body end opposite the first body end, the body strap including a first pin support and a second pin support, the first and second pin supports extending from the main body, the body strap including a protrusion extending from the second body end of the main body, the protrusion including a protrusion body coupled to the second body end of the main body and an annular body coupled to the protrusion body;
a door strap partially disposed between the first and second pin supports;
a pin movably interconnecting the body strap and the door strap, the pin extending along an axis and being supported by the first and second pin supports; and
wherein the annular body at least partially surrounds the pin.

15. The vehicle of claim 14, wherein the protrusion includes a structural integrity feature.

16. The vehicle of claim 15, wherein the structural integrity feature is an undulation.

17. The vehicle of claim 16, wherein the protrusion has a first protrusion end and a second protrusion end, and the undulation extends from the first protrusion end to the second protrusion end.

18. The vehicle of claim 17, wherein the door strap includes a first door connection section, a second door connection section, and a pin connection section interconnecting the first and second door connection sections, and the protrusion is disposed between the first and second door connection sections.

19. The vehicle of claim 18, wherein the pin connection section includes a first wall directly connected to the first door connection section, a second wall directly connected to the second door connection section, and a third wall directly interconnecting the first and second walls, and the protrusion is disposed between the first and second walls.

20. The vehicle of claim 19, wherein the pin extends through the pin connection section.

* * * * *